(12) United States Patent
Whitney et al.

(10) Patent No.: US 8,967,118 B2
(45) Date of Patent: Mar. 3, 2015

(54) TURBOCHARGER BOOST CONTROL SYSTEMS AND METHODS FOR GEAR SHIFTS

(75) Inventors: Christopher E. Whitney, Commerce, MI (US); Jeffrey M. Kaiser, Highland, MI (US); Per Andersson, Lidköping (SE); Timothy L. Gibbs, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 741 days.

(21) Appl. No.: 13/027,376

(22) Filed: Feb. 15, 2011

(65) Prior Publication Data

US 2012/0180759 A1 Jul. 19, 2012

Related U.S. Application Data

(60) Provisional application No. 61/432,813, filed on Jan. 14, 2011.

(51) Int. Cl.
*F02P 5/04* (2006.01)
*F02D 13/02* (2006.01)
(Continued)

(52) U.S. Cl.
CPC ............ *F02D 13/0219* (2013.01); *F02D 17/02* (2013.01); *F02D 37/02* (2013.01);
(Continued)

(58) Field of Classification Search
CPC ..... F02B 37/18; F02D 37/02; F02D 41/0007; F02D 41/0087; F02D 41/023; F02D 2200/1004; F02D 2250/21; F02P 5/1504; B60W 30/19; Y02T 10/144

USPC ............. 123/406.11, 406.12, 406.23, 481, 123/559.1, 564, 54, 84, 85; 701/101–103, 701/105, 110, 111, 198 DB, 325, 332; 477/33, 102; 60/600–602, 605.1
See application file for complete search history.

(56) References Cited

U.S. PATENT DOCUMENTS 5,050,452 A * 9/1991 Morioka .......................... 477/33
5,081,887 A * 1/1992 Kato ................................ 477/33
(Continued)

FOREIGN PATENT DOCUMENTS

CN 101576016 A 11/2009
DE 4023971 A1 2/1991
(Continued)

*Primary Examiner* — Mahmoud Gimie
*Assistant Examiner* — John Zaleskas

(57) ABSTRACT

A method includes: retarding spark timing relative to a predetermined spark timing when an engine torque output reduction is requested for a gear shift; estimating a first torque output of an engine based on N cylinders of the engine being fueled, an engine speed, an air per cylinder (APC), and the predetermined spark timing; estimating a second torque output of the engine based on M cylinders being fueled, the engine speed, the APC, and the spark timing. determining an initial pressure ratio across a turbocharger compressor; determining an adjustment based on M and the first and second torque outputs; generating a desired pressure ratio across the turbocharger compressor based on the adjustment and the initial pressure ratio; and controlling opening of a turbocharger wastegate based on the desired pressure ratio. N is a total number of cylinders of the engine and M is less than or equal to N.

20 Claims, 6 Drawing Sheets

(51) Int. Cl.
- *F02D 17/02* (2006.01)
- *F02D 37/02* (2006.01)
- *F02D 41/00* (2006.01)
- *F02D 41/02* (2006.01)
- *F02P 5/15* (2006.01)

(52) U.S. Cl.
CPC ........ *F02D41/0007* (2013.01); *F02D 41/0087* (2013.01); *F02D 41/023* (2013.01); *F02P 5/1504* (2013.01); *F02D 2200/1004* (2013.01); *F02D 2250/21* (2013.01); *Y02T 10/46* (2013.01); *Y02T 10/144* (2013.01); *Y02T 10/18* (2013.01)
USPC ...... 123/406.23; 123/481; 123/564; 701/102; 60/602; 477/33

(56) References Cited

U.S. PATENT DOCUMENTS

| | | | | |
|---|---|---|---|---|
| 5,109,826 | A * | 5/1992 | Kato | 123/564 |
| 5,119,696 | A * | 6/1992 | Yamaguchi | 477/109 |
| 5,228,368 | A * | 7/1993 | Kato et al. | 477/33 |
| 5,477,840 | A * | 12/1995 | Neumann | 123/564 |
| 5,778,324 | A * | 7/1998 | Smith | 455/562.1 |
| 5,921,883 | A * | 7/1999 | Bellinger | 477/33 |
| 6,134,888 | A * | 10/2000 | Zimmer et al. | 60/600 |
| 6,619,258 | B2 * | 9/2003 | McKay et al. | 123/350 |
| 6,687,591 | B2 * | 2/2004 | Abe | 701/54 |
| 6,692,406 | B2 * | 2/2004 | Beaty | 477/32 |
| 6,704,638 | B2 * | 3/2004 | Livshiz et al. | 701/102 |
| 6,817,965 | B2 * | 11/2004 | Tabata | 477/33 |
| 2007/0192015 | A1 * | 8/2007 | Konishi | 701/102 |
| 2007/0234984 | A1 * | 10/2007 | Kolmanovsky et al. | 123/90.15 |
| 2009/0018733 | A1 * | 1/2009 | Livshiz et al. | 701/54 |
| 2009/0118968 | A1 * | 5/2009 | Livshiz et al. | 701/102 |
| 2009/0118977 | A1 * | 5/2009 | Whitney et al. | 701/103 |
| 2009/0183507 | A1 * | 7/2009 | Weaver et al. | 60/602 |
| 2010/0268436 | A1 * | 10/2010 | Soejima et al. | 701/102 |
| 2011/0045948 | A1 * | 2/2011 | Doering et al. | 477/33 |
| 2011/0257854 | A1 * | 10/2011 | Whitney et al. | 701/54 |

FOREIGN PATENT DOCUMENTS

| | | |
|---|---|---|
| DE | 102004019315 A1 | 11/2005 |
| DE | 102008054060 A1 | 8/2009 |

* cited by examiner

TURBOCHARGER BOOST CONTROL SYSTEMS AND METHODS FOR GEAR SHIFTS

CROSS-REFERENCE TO RELATED APPLICATIONS

This application claims the benefit of U.S. Provisional Application No. 61/432,813, filed on Jan. 14, 2011. The disclosure of the above application is incorporated herein by reference in its entirety.

FIELD

The present disclosure relates to internal combustion engines and more particularly to turbochargers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A spark control module retards spark timing relative to a predetermined spark timing when an engine torque output reduction is requested for a gear shift. A torque estimation module estimates a first torque output of an engine based on N cylinders of the engine being fueled, an engine speed, an air per cylinder (APC), and the predetermined spark timing and estimates a second torque output of the engine based on M cylinders being fueled, the engine speed, the APC, and the spark timing, wherein N is equal to a total number of cylinders of the engine and M is one of less than and equal to N. An initial ratio determination module that determines an initial pressure ratio across a turbocharger compressor. An adjustment determination module determines an adjustment based on M and the first and second torque outputs. A desired ratio determination module generates a desired pressure ratio across a turbocharger based on the adjustment and the initial pressure ratio. A boost actuator module controls opening of a wastegate associated with the turbocharger based on the desired pressure ratio.

A method includes: retarding spark timing relative to a predetermined spark timing when an engine torque output reduction is requested for a gear shift; estimating a first torque output of an engine based on N cylinders of the engine being fueled, an engine speed, an air per cylinder (APC), and the predetermined spark timing; estimating a second torque output of the engine based on M cylinders being fueled, the engine speed, the APC, and the spark timing, wherein N is equal to a total number of cylinders of the engine and M is one of less than and equal to N; determining an initial pressure ratio across a turbocharger compressor; determining an adjustment based on M and the first and second torque outputs; generating a desired pressure ratio across the turbocharger compressor based on the adjustment and the initial pressure ratio; and controlling opening of a wastegate associated with the turbocharger based on the desired pressure ratio.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
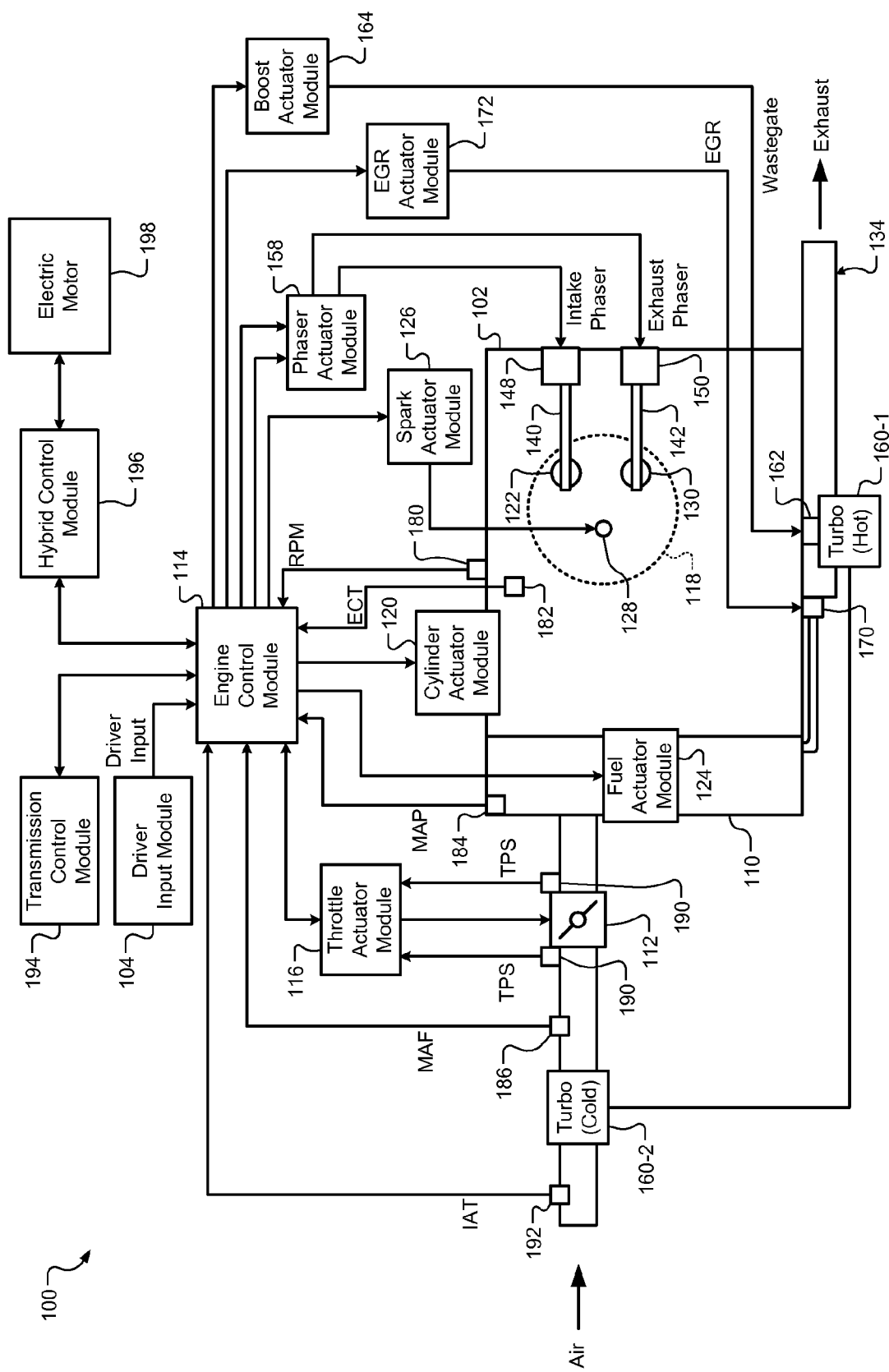
FIG. 1 is a functional block diagram of an exemplary engine system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a systemon-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine control module (ECM) controls torque output by an engine. A transmission control module (TCM) controls gear shifts within a transmission. The TCM may selectively generate a request for a reduction in the engine torque output. For example only, the TCM may generate a torque reduction request for an upshift. The ECM retards spark timing relative to an optimum spark timing based on the request.

Rotation of a turbocharger turbine is driven by exhaust output by the engine. The turbocharger turbine is mechanically linked to a turbocharger compressor, and rotation of the turbocharger turbine drives the turbocharger compressor. The turbocharger compressor compresses air provided to the engine. Opening of a wastegate enables exhaust to bypass the turbocharger turbine. The output of the turbocharger compressor decreases as the amount of exhaust bypassing the turbocharger turbine via the wastegate increases.

Retarding the spark timing relative to the optimum timing reduces the torque output of the engine. Retarding the spark timing also correspondingly increases the energy of the exhaust output from the engine. The increased energy of the exhaust may drive the turbocharger turbine faster, and the turbocharger compressor may provide an increased amount of air to the engine. The ECM of the present disclosure increases the opening of the wastegate to counteract the increase in the exhaust energy.

Referring now to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbocharger turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbocharger turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbocharger turbine 160-1 and the turbocharger compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger turbine 160-1. The EGR valve 170 may be controlled by an EGR actuator module 172.

The engine system 100 may measure the rotational speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in an automatic type transmission (not shown). The automatic type transmission may include, for example, an automatic transmission, a clutch to clutch transmission, a dual clutch transmission, or another suitable type of automatic transmission. For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
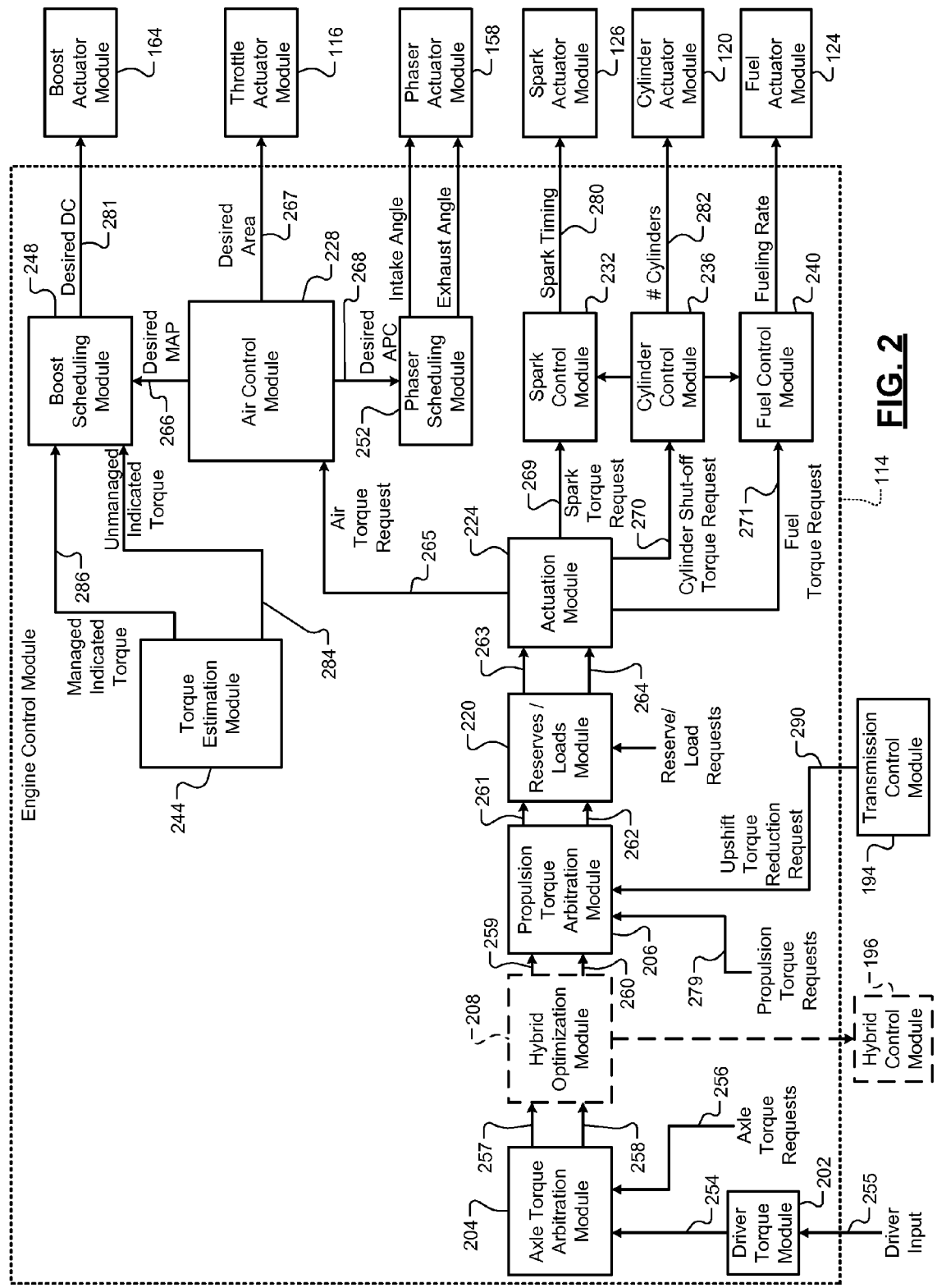
FIG. 2 is a functional block diagram of an exemplary engine control system according to the present disclosure.

Referring now to FIG. 2, a functional block diagram of an exemplary engine control system is presented. An exemplary implementation of the ECM 114 includes a driver torque module 202, an axle torque arbitration module 204, and a propulsion torque arbitration module 206. The ECM 114 may include a hybrid optimization module 208. The exemplary implementation of the ECM 114 also includes a reserves/loads module 220, an actuation module 224, an air control module 228, a spark control module 232, a cylinder control module 236, and a fuel control module 240. The exemplary implementation of the ECM 114 also includes a torque estimation module 244, a boost scheduling module 248, and a phaser scheduling module 252.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to desired torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. Generally, torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

The axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control actuators of the engine system 100.

In general terms, the immediate torque request 258 is the amount of currently desired axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the actuator values to allow a faster transition to the predicted torque request 257, while still maintaining the axle torque at the immediate torque request 258.

In various implementations, the predicted torque request 257 may be based on the driver torque request 254. The immediate torque request 258 may be less than the predicted torque request 257, such as when the driver torque request 254 is causing wheel slip on an icy surface. In such a case, a traction control system (not shown) may request a reduction via the immediate torque request 258, and the ECM 114 reduces the torque produced by the engine system 100 to the immediate torque request 258. However, the ECM 114 controls the engine system 100 so that the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request 257, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request 258 is within the range, fast engine actuators can be set to cause the axle torque to be equal to the immediate torque request 258. When the ECM 114 requests the predicted torque request 257 to be output, the fast engine actuators can be controlled to vary the axle torque to the top of the range, which is the predicted torque request 257.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request 257 if the fast actuators were set to appropriate values. Meanwhile, the ECM 114 may set actuator values for fast actuators to values that, given the slow actuator values, cause the engine system 100 to produce the immediate torque request 258 instead of the predicted torque request 257.

The fast actuator values therefore cause the engine system 100 to produce the immediate torque request 258. When the ECM 114 decides to transition the axle torque from the immediate torque request 258 to the predicted torque request 257, the ECM 114 changes the actuator values for one or more fast actuators to values that correspond to the predicted torque request 257. Because the slow actuator values have already been set based on the predicted torque request 257, the engine system 100 is able to produce the predicted torque request 257 after only the delay imposed by the fast actuators. In other words, the longer delay that would otherwise result from changing axle torque using slow actuators is avoided.

For example only, when the predicted torque request 257 is equal to the driver torque request 254, a torque reserve may be created when the immediate torque request 258 is less than the driver torque request 254 due to a temporary torque reduction request. Alternatively, a torque reserve may be created by increasing the predicted torque request 257 above the driver torque request 254 while maintaining the immediate torque request 258 at the driver torque request 254. The resulting torque reserve can absorb sudden increases in required axle torque. For example only, sudden loads imposed by an air conditioner or a power steering pump may be counteracted by increasing the immediate torque request 258. If the increase in the immediate torque request 258 is less than the torque reserve, the increase can be quickly produced by using fast actuators. The predicted torque request 257 may also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request 258 while maintaining the values of the slow actuators. For example, to maintain a given idle speed, the immediate torque request 258 may vary within a range. If the predicted torque request 257 is set to a level above this range, variations in the immediate torque request 258 that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to an optimum spark timing, a maximum amount of torque may be produced in the combustion stroke, immediately following the firing event. However, a spark advance deviating from the optimum spark timing may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the optimum spark timing is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle opening area are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce the predicted torque request 257. Meanwhile, the spark timing can be set based on the immediate torque request 258, which is less than the predicted torque request 257. Although the throttle opening area generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark advance to an optimum spark timing, which allows the engine 102 to produce the full engine output torque achievable with the air flow already present. The engine output torque may therefore be quickly increased to the predicted torque request 257 without experiencing delays from changing the throttle opening area.

When the engine 102 is a compression-ignition engine, the fuel actuator module 124 may be a fast actuator and the throttle actuator module 116 and the boost actuator module 164 may be emissions actuators. The fuel mass may be set based on the immediate torque request 258, and the throttle opening area, boost, and EGR opening may be set based on the predicted torque request 257. The throttle opening area may generate more air flow than necessary to satisfy the predicted torque request 257. In turn, the air flow generated may be more than required for complete combustion of the injected fuel such that the air/fuel ratio is usually lean and changes in air flow do not affect the engine output torque. The engine output torque will therefore be equal to the immediate torque request 258 and may be increased or decreased by adjusting the fuel flow.

The throttle actuator module 116, the boost actuator module 164, and the EGR valve 170 may be controlled based on the predicted torque request 257 to control emissions and to minimize turbo lag. The throttle actuator module 116 may create a vacuum within the intake manifold 110 to draw exhaust gases through the EGR valve 170 and into the intake manifold 110.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests 259 and 260 received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 279, including the converted predicted and immediate torque requests 259 and 260. The propulsion torque arbitration module 206 generates an arbitrated predicted torque request 261 and an arbitrated immediate torque request 262. The arbitrated predicted and immediate torque requests 261 and 262 may be generated by selecting a winning request from among the received torque requests. Alternatively or additionally, the arbitrated torque requests may be generated by modifying one of the received requests based on another one or more of the received torque requests.

The propulsion torque requests 279 may include torque reductions for engine over-speed protection and torque increases for stall prevention. The propulsion torque requests 279 may also result from clutch fuel cutoff, which reduces the engine output torque when the driver depresses the clutch pedal in a manual transmission vehicle to prevent a flare (rapid rise) in engine speed.

The propulsion torque requests 279 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and/or immediate torque requests 261 and 262 to create a torque reserve and/or to compensate for one or more loads. The reserves/loads module 220 then outputs adjusted predicted and immediate torque requests 263 and 264 to the actuation module 224.

For example only, a catalyst light-off process or a cold start emissions reduction process may require a retarded spark timing. The reserves/loads module 220 may therefore increase the adjusted predicted torque request 263 above the adjusted immediate torque request 264 to create the retarded spark timing for the cold start emissions reduction process while maintaining the engine output torque. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the NC compressor clutch engages, the reserves/loads module 220 may increase the adjusted immediate torque request 264 by the estimated load of the A/C compressor clutch.

The actuation module 224 receives the adjusted predicted and immediate torque requests 263 and 264. The actuation module 224 determines how the adjusted predicted and immediate torque requests 263 and 264 will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request 265 based on the adjusted predicted torque request 263. The air torque request 265 may be equal to the adjusted predicted torque request 263, setting air flow so that the adjusted predicted torque request 263 can be achieved.

The air control module 228 may determine desired actuator values based on the air torque request 265. For example only, the air control module 228 may determine a desired MAP 266, a desired throttle area 267, and/or a desired air per cylinder (APC) 268 based on the air torque request 265. The desired MAP 266 may be used to determine a desired duty cycle (DC) for the wastegate 162, and the desired APC 268 may be used to determine desired cam phaser positions and the desired throttle area 267. In various implementations, the air control module 228 may also determine a desired amount of opening of the EGR valve 170 based on the air torque request 265.

The actuation module 224 may also generate a spark torque request 269, a cylinder shut-off torque request 270, and a fuel torque request 271. The spark torque request 269 may be used by the spark control module 232 to determine how much to retard the spark timing 280 (which reduces engine output torque) relative to an optimum spark timing.

The cylinder shut-off torque request 270 may be used by the cylinder control module 236 to determine how many cylinders to deactivate 282 when operation in a fuel economy (FE) mode is requested. The FE mode may include, for example only, an active fuel management (AFM) mode or a displacement on demand (DOD). The cylinder control module 236 may instruct the cylinder actuator module 120 a number of cylinders to deactivate 282 based on the cylinder shut-off torque request 270. The cylinder actuator module 120 may include a hydraulic system that selectively decouples intake and/or exhaust valves from the corresponding camshafts for one or more cylinders in order to deactivate that number of cylinders. For example only, the cylinder actuator module 120 may deactivate a predefined group of cylinders (e.g., half) jointly when the AFM mode is commanded. The cylinder control module 236 may also instruct the fuel control module 240 to stop providing fuel for deactivated cylinders and may instruct the spark control module 232 to stop providing spark for deactivated cylinders when the AFM mode is commanded. The spark control module 232 may stop providing spark for a cylinder once an fuel/air mixture that is already present in the cylinder has been combusted.

Some vehicles may additionally or alternatively be capable of operating the engine 102 in a fuel cutoff (FCO) mode. For example only, operation in the FCO mode may be commanded during vehicle deceleration. Operation in the FCO mode commanded pursuant to vehicle deceleration may be referred to as deceleration fuel cutoff (DFCO). In contrast with the AFM mode, one or more cylinders may be deactivated by halting provision of fuel to those cylinders when the FCO mode is commanded, without stopping the opening and closing of the intake and exhaust valves.

The fuel control module 240 may vary the amount of fuel provided to each cylinder based on the fuel torque request 271. During normal operation of a spark-ignition engine, the fuel control module 240 may operate in an air lead mode in which the fuel control module 240 attempts to maintain a stoichiometric air/fuel ratio by controlling fueling based on air flow. The fuel control module 240 may determine a fuel mass that will yield stoichiometric combustion when combined with the current amount of air per cylinder (APC). The fuel control module 240 may instruct the fuel actuator module 124 via a fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request 271 while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

The air control module 228 may output the desired throttle area 267 to the throttle actuator module 116. The throttle actuator module 116 then regulates the throttle valve 112 to produce the desired throttle area 267. The air control module 228 may determine the desired throttle area 267 based on the air torque request 265.

The air control module 228 may output the desired MAP 266 to the boost scheduling module 248. The boost scheduling module 248 (e.g., see FIGS. 4-7) may determine a desired pressure ratio based on the desired MAP 266. A pressure ratio refers to the ratio of the pressure upstream of the turbocharger compressor 160-2 to the pressure downstream of the turbocharger compressor 160-2. For example only, the pressure upstream of the turbocharger compressor 160-2 may be indicated by ambient air pressure, and the pressure downstream of the turbocharger compressor 160-2 may be indicated by throttle inlet air pressure. In various implementations, measured pressures upstream and downstream of the turbocharger compressor 160-2 or other suitable pressures may be used.

The boost scheduling module 248 may use the desired pressure ratio to control the boost actuator module 164. More specifically, the boost scheduling module 248 may determine a desired DC 281 for the wastegate 162 based on the desired pressure ratio. The boost scheduling module 248 provides the desired DC 281 to the boost actuator module 164. The boost actuator module 164 applies a signal to the wastegate 162 at the desired DC 281 to control the (boost of) turbocharger 160. A decrease in the desired DC 281 may cause an increase in the opening of the wastegate 162 and a decrease in the boost of the turbocharger 160 and vice versa.

The air control module 228 outputs the desired APC 268 to the phaser scheduling module 252. Based on the desired APC 268 and the engine speed, the phaser scheduling module 252 may control positions of the intake and/or exhaust cam phasers 148 and 150 using the phaser actuator module 158.

Referring back to the spark control module 232, the optimum spark timing may vary based on various engine operating conditions. For example only, a torque relationship may be inverted to solve for the spark timing 280 based on the spark torque request 269. For a given value of the spark torque request 269 ($T_{des}$), the spark timing 280 ($S_{des}$) may be determined based on $$S_{des}=T^{-1}(T_{des},APC,I,E,AF,OT,\#).\qquad(1)$$

This relationship may be embodied as a function (e.g., equation) and/or as a lookup table. The air/fuel ratio (AF) may be the actual air/fuel ratio, as reported by the fuel control module 240.

When the spark timing 280 is set to the optimum spark timing, the resulting engine output torque may be as close to a maximum best torque (MBT) as possible. MBT refers to the maximum engine output torque that is generated for given air flow conditions as the spark timing 280 is varied, while using fuel having an octane rating greater than a predetermined octane rating and using stoichiometric fueling. The spark timing 280 at which this maximum torque occurs may be referred to as an MBT spark timing. The optimum spark timing may differ slightly from the MBT spark timing because of, for example, fuel quality (such as when lower octane fuel is used relative to the fuel used in calibrating the relationship) and environmental factors. The engine output torque at the optimum spark timing may therefore be less than MBT.

The torque estimation module 244 determines an amount of torque that the engine 102 would produce if all cylinders were fueled and the spark timing 280 is at the optimum spark timing for the current engine speed and APC. This torque may be referred to as an unmanaged indicated torque 284.

The torque estimation module 244 also determines an amount of torque that the engine 102 is producing with the number of cylinders being fueled, the spark timing 280, the engine speed, and the APC. This torque may be referred to as a managed indicated torque 286. When all cylinders are being fueled and the spark timing 280 is set to the optimum spark timing, the unmanaged indicated torque 284 and the managed indicated torque 286 are equal.

Indicated torques are expressed without taking into consideration torque losses and loads, such as engine pumping losses, frictional losses, and accessory loads on the engine 102. In contrast, brake torques take into account the torque losses and loads. A brake torque may be determined as an indicated torque minus the torque losses and loads. For example only, an unmanaged braking torque (not shown) may be equal to the unmanaged indicated torque 284 minus the torque losses and loads. An indicated torque is limited to zero, but a brake torque can be negative (when the indicated torque is less than the torque losses and loads).

Referring back to the propulsion torque requests 279, the propulsion torque requests 279 may also include torque reductions requested by the transmission control module 194 for gear shifts. For example only, the transmission control module 194 may generate an upshift torque reduction request 290 to reduce the engine output torque for an upshift. While the present disclosure will be discussed as it relates to the upshift torque reduction request 290 generated by the transmission control module 194 for an upshift, the present disclosure is also applicable to other torque reduction requests for gear shifts, such as power-on downshifts.

A gear ratio may be defined as a ratio of transmission input shaft speed and transmission output shaft speed. An upshift refers to a gear shift from a gear corresponding to a higher gear ratio to a gear corresponding to a lower gear ratio, such as a gear shift from a second gear to a third gear, a gear shift from the third gear to a fourth gear, etc.

An upshift generally includes two phases: a torque phase and an inertia phase. During the torque phase, one or more clutches (e.g., offgoing and oncoming clutches) are prepared for the gear shift. During the inertia phase, the oncoming clutch is engaged. The engagement of the oncoming clutch causes the current gear ratio to change toward the gear ratio of the oncoming gear. The transmission control module 194 may generate the upshift torque reduction request 290 during the inertia phase of an upshift.

Figure 3:
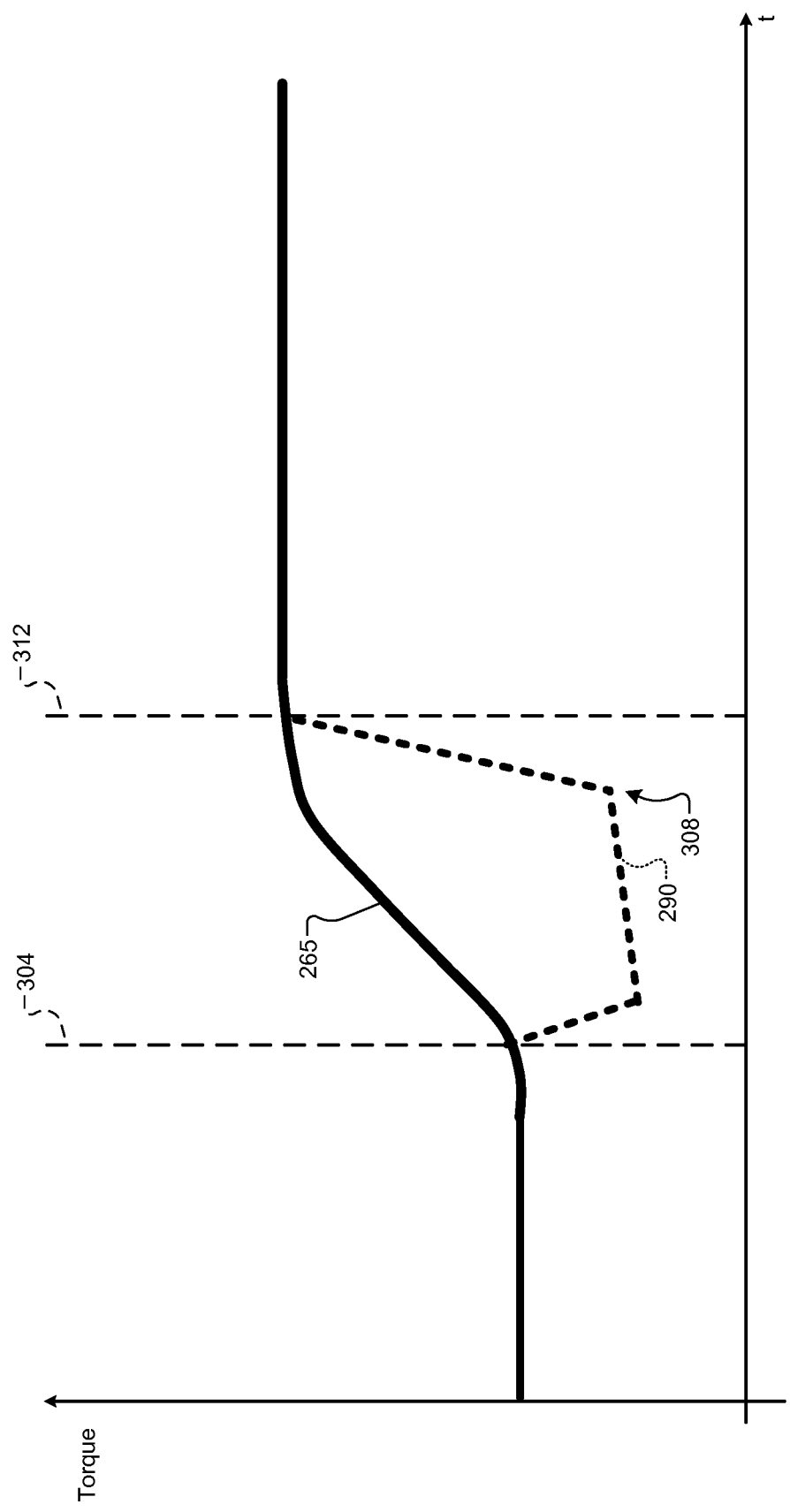
FIG. 3 is an example graph of various torque requests as functions of time according to the present disclosure.

Referring now to FIG. 3, an example graph of the air torque request 265 and the upshift torque reduction request 290 as functions of time is presented. The inertia phase of an upshift begins at approximately time 304 in the example of FIG. 3. The air torque request 265 may increase for the upshift because a greater amount of engine torque output may be needed to achieve the same amount of axle torque (i.e., torque at the wheels) as the gear ratio decreases during the inertia phase of the upshift.

The transmission control module 194 may begin generating the upshift torque reduction request 290 when the inertia phase of the upshift begins. When the inertia phase of the upshift begins, the transmission control module 194 may set the upshift torque reduction request 290 equal to the air torque request 265. The transmission control module 194 may begin decrease the upshift torque reduction request 290 from the air torque request 265 to aid in decreasing the engine speed during the upshift. The transmission control module 194 begins decreasing the upshift torque reduction request 290 at approximately time 304 in the example of FIG. 3.

Near the end of the upshift, for example at approximately time 308, the transmission control module 194 may begin adjusting the upshift torque reduction request 290 back toward the air torque request 265. The transmission control module 194 may adjust the upshift torque reduction request 290 toward the air torque request 265 such that the upshift torque reduction request 290 reaches the air torque request 265 near or at the time when the upshift is complete. For example only, the transmission control module 194 may ramp the upshift torque reduction request 290 up to the air torque request 265 at a predetermined rate over a predetermined period. The transmission control module 194 may stop generating the upshift torque reduction request 290 when the upshift is complete and/or the upshift torque reduction request 290 reaches the air torque request 265. The upshift is completed at approximately time 312 in the example of FIG. 3.

Referring back to FIG. 2, the upshift torque reduction request 290 is an immediate torque request. The propulsion torque arbitration module 206 sets the arbitrated immediate torque request 262 equal to the upshift torque reduction request 290 when the transmission control module 194 generates the upshift torque reduction request 290. The actuation module 224 generally sets the spark torque request 269 equal to the adjusted immediate torque request 264.

The upshift torque reduction request 290 causes the spark control module 232 to retard the spark timing 280 based on the upshift torque reduction request 290 during the upshift. Retarding the spark timing 280 reduces the engine output torque. However, an increased amount of energy is provided to the exhaust system 134 when the spark timing 280 is retarded. The additional energy may cause the turbocharger turbine 160-1 to rotate faster. The faster rotation of the turbocharger turbine 160-1 may cause the turbocharger compressor 160-2 to provide more air to the engine 102. As the spark timing 280 is advanced based on the increasing upshift torque reduction request 290 near the end of the upshift, the engine 102 can produce a greater amount of torque (due to the additional air).

As stated above, the boost scheduling module 248 may determine the desired pressure ratio based on the desired MAP 266. The boost scheduling module 248 of the present disclosure determines an adjustment based on the unmanaged indicated torque 284 and the managed indicated torque 286 during an upshift. The boost scheduling module 248 adjusts the desired pressure ratio based on the adjustment to decrease the desired pressure ratio during the upshift. Based on the decrease in the desired pressure ratio, the boost scheduling module 248 decreases the desired DC 281, and the opening of the wastegate 162 is increased. The opening of the wastegate 162 counteracts the increased energy provided to the exhaust system 134 via the retardation of the spark timing 280.

Figure 4:
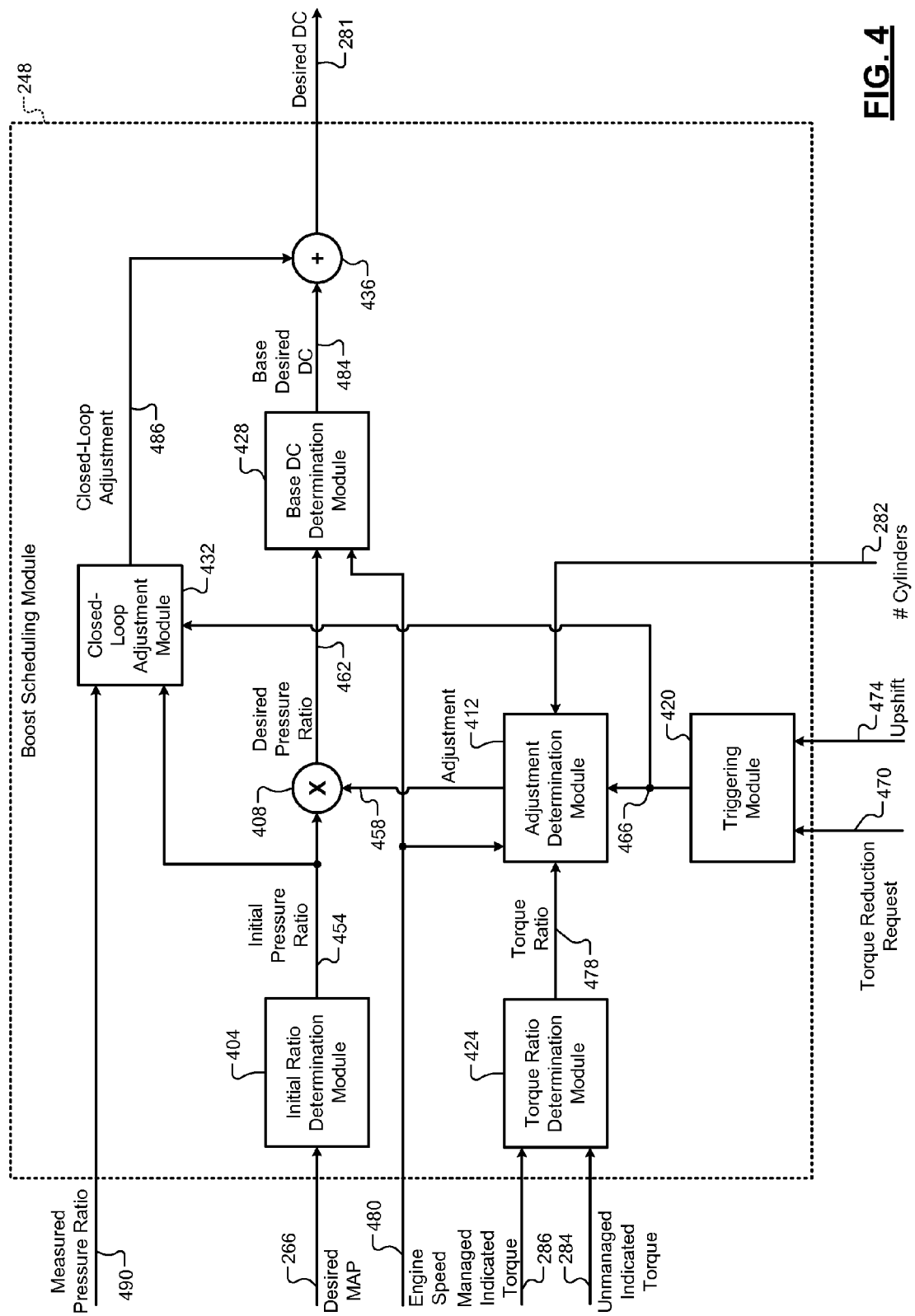
FIGS. 4-5 are functional block diagrams of example air control modules according to the present disclosure.

Referring now to FIG. 4, a functional block diagram of an example implementation of the boost scheduling module 248 is presented. The boost scheduling module 248 includes an initial ratio determination module 404, a desired pressure ratio determination module 408, an adjustment determination module 412, and a triggering module 420. The boost scheduling module 248 also includes a torque ratio determination module 424, a base DC determination module 428, a closed-loop adjustment module 432, and a desired DC determination module 436.

The initial ratio determination module 404 determines an initial pressure ratio 454 based on the desired MAP 266. For example only, the initial ratio determination module 404 may determine the initial pressure ratio 454 using a mapping or a function that relates the desired MAP 266 to the initial pressure ratio 454. In this manner, the initial ratio determination module 404 determines the initial pressure ratio 454 in open-loop. While the present disclosure will be discussed in terms of the boost scheduling module 248 determining the desired DC 281 based on a desired pressure ratio, the boost scheduling module 248 may determine the desired DC 281 based on the desired MAP 266 similarly in various implementations.

The desired pressure ratio determination module 408 adjusts the initial pressure ratio 454 based on an adjustment 458. For example only, the adjustment 458 may include a value between 0.0 and 1.0, inclusive, and the desired pressure ratio determination module 408 may adjust the initial pressure ratio 454 by multiplying the initial pressure ratio 454 by the adjustment 458. The result of the adjustment may be referred to as a desired pressure ratio 462.

In various implementations, the adjustment 458 may include a value that is greater than or equal to zero or a value that is less than or equal to zero. In implementations where the adjustment 458 includes a value that is greater than or equal to zero, the desired pressure ratio determination module 408 may adjust the initial pressure ratio 454 by subtracting the value from the initial pressure ratio 454. In implementations where the adjustment 458 includes a value that is less than or equal to zero, the desired pressure ratio determination module 408 may adjust the initial pressure ratio 454 by summing the value and the initial pressure ratio 454.

The adjustment determination module 412 generates the adjustment 458. The adjustment determination module 412 may set the adjustment 458 equal to a predetermined non-adjusting value when less than all of the cylinders of the engine 102 are being fueled. The number of cylinders to deactivate 282 being greater than zero or another suitable indicator may be used to determine when less than all of the cylinders are being fueled, such as whether a FE mode is active or whether a fuel cutoff mode is active. For example only, the predetermined non-adjusting value may be zero in implementations where the adjustment 458 includes a value that is greater than or equal to zero or a value that is less than or equal to zero. In implementations where the adjustment 458 includes a value between 0.0 and 1.0, inclusive, the predetermined non-adjusting value may be 1.0. In this manner, the adjustment 458 will provide no adjustment when the adjustment 458 is equal to the predetermined non-adjusting value.

While a triggering signal 466 is in an active state and all of the cylinders of the engine 102 are being fueled, the adjustment determination module 412 may generate the adjustment 458 based on a torque ratio 478. The adjustment determination module 412 may generate the adjustment 458 further based on an engine speed 480. The engine speed 480 may be determined based on the signal output by the engine speed sensor 180. For example only, the adjustment determination module 412 may generate the adjustment 458 using one or more functions and/or mappings that relate the torque ratio 478 and the engine speed 480 to the adjustment 458. The adjustment 458 may be generated based on the engine speed 480 such that the adjustment is made based on the flow of the exhaust. The adjustment determination module 412 may decrease the adjustment 458 as the torque ratio 478 approaches 0.0 and vice versa as the torque ratio 478 approaches 1.0.

The triggering module 420 generates the triggering signal 466. The triggering module 420 sets the triggering signal 466 to the active state when the transmission control module 194 is generating the upshift torque reduction request 290. For example only, the transmission control module 194 may set a torque reduction request signal 470 and an upshift signal 474 to active states when the transmission control module 194 is generating the upshift torque reduction request 290. The triggering module 420 may set the triggering signal to the active state when the torque reduction request signal 470 and the upshift signal 474 are in the active states. In various implementations, the triggering module 420 may additionally or alternatively set the triggering signal 466 to the active state when the upshift torque reduction request 290 is non-zero. In various implementations, the triggering module 420 may generate the triggering signal 466 based on another suitable indicator that the transmission control module 194 is generating the upshift torque reduction request 290.

The torque ratio determination module 424 generates the torque ratio 478 based on the unmanaged indicated torque 284 and the managed indicated torque 286. For example only, the torque ratio determination module 424 may set the torque ratio 478 equal to the managed indicated torque 286 divided by the unmanaged indicated torque 284. In this manner, the torque ratio 478 decreases as the managed indicated torque 286 decreases and/or as the unmanaged indicated torque 284 increases.

The desired pressure ratio determination module 408 outputs the desired pressure ratio 462 to the base DC determination module 428. The base DC determination module 428 generates a base desired DC 484 for the wastegate 162 based on the desired pressure ratio 462. The base DC determination module 428 may generate the base desired DC 484 further based on the engine speed 480. For example only, the base DC determination module 428 may generate the base desired DC 484 using one or more functions and/or mappings that relate the desired pressure ratio 462 and the engine speed 480 to the base desired DC 484. The base desired DC 484 may be generated based on the engine speed 480 because the relationship between pressure ratio and DC is a function of engine speed.

The closed-loop adjustment module 432 generates a closed-loop adjustment 486 based on the initial pressure ratio 454. The closed-loop adjustment module 432 generates the closed-loop adjustment 486 further based on a measured pressure ratio 490. The closed-loop adjustment module 432 may generate the closed-loop adjustment 486, for example, using a proportional-integral-derivative (PID) control strategy or another suitable type of closed-loop control strategy. The closed-loop adjustment module 432 may disable the integral gain or adjust the integral gain to a predetermined minimum value when the triggering signal 466 is in the active state. This may prevent wind-up of the integral term used in determining the closed-loop pressure ratio during the transient, upshift condition.

The measured pressure ratio 490 may be determined based on a pressure upstream of the turbocharger compressor 160-2 and a pressure downstream of the turbocharger compressor 160-2. For example only, the measured pressure ratio 490 may be determined based on a ratio of an ambient air pressure and the throttle inlet air pressure.

The base desired DC 484 and the closed-loop adjustment 486 are provided to the desired DC determination module 436. The desired DC determination module 436 determines the desired DC 281 based on the base desired DC 484 and the closed-loop adjustment 486. For example only, the desired DC determination module 436 may set the desired DC 281 equal to the sum of the base desired DC 484 and the closed-loop adjustment 486. In various implementations, the desired DC determination module 436 may set the desired DC 281 equal to the product of the base desired DC 484 and the closed-loop adjustment 486.

The desired DC determination module 436 decreases the desired DC 281 as the desired pressure ratio 462 decreases. The boost actuator module 164 decreases the DC of the signal applied to the wastegate 162 as the desired DC 281 decreases. The opening of the wastegate 162 increases as the desired DC 281 decreases, thereby allowing more exhaust gas to bypass the turbocharger turbine 160-1 and decreasing the boost provided by the turbocharger 160.

Figure 5:
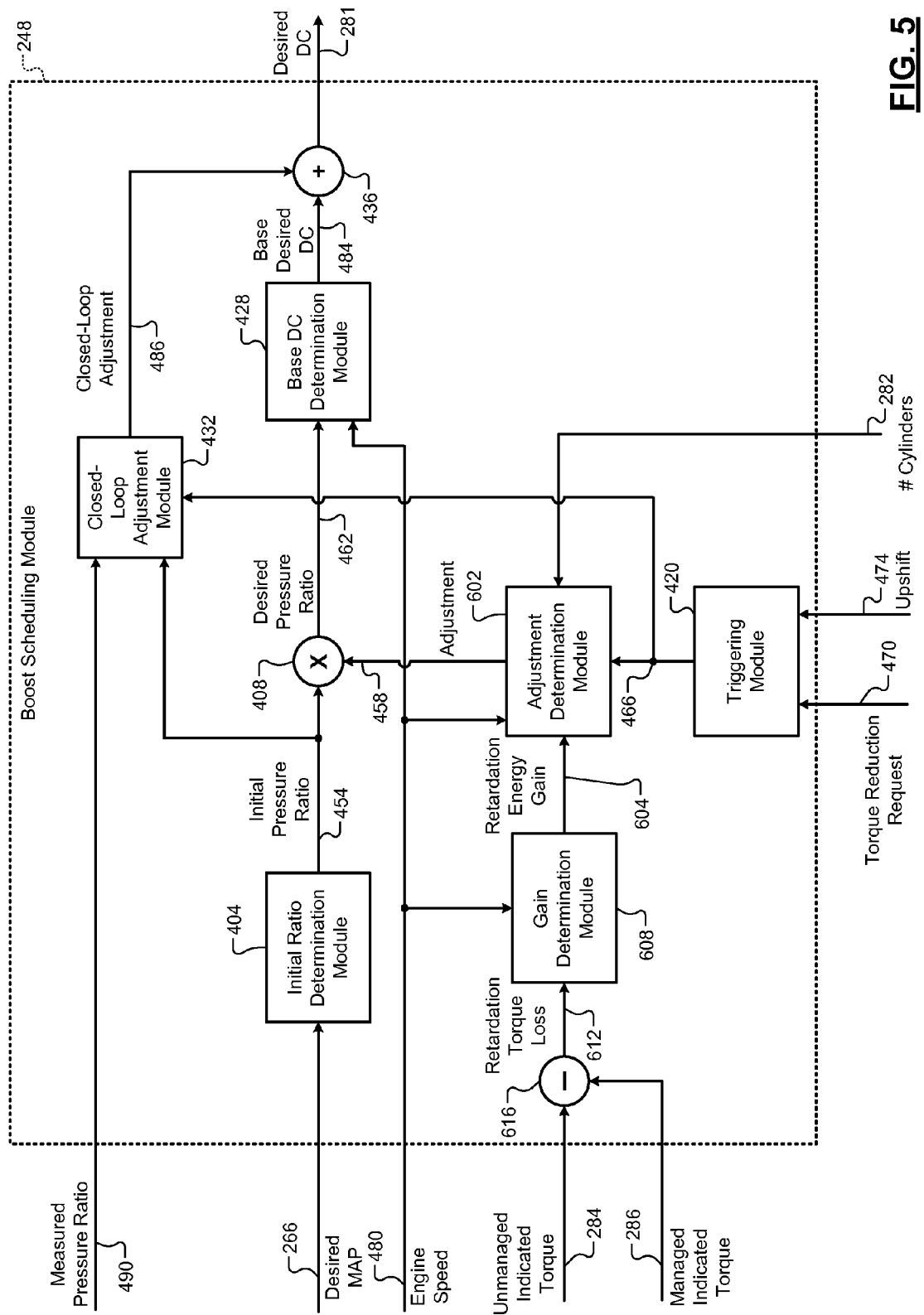

Referring now to FIG. 5, a functional block diagram of another example implementation of the boost scheduling module 248 is presented. Instead of determining the adjustment 458 based on the torque ratio 478 as in the example of FIG. 4, an adjustment determination module 602 may determine the adjustment 458 based on a gain in the energy input to the exhaust system 134 attributable to retardation of the spark timing 280. This gain may be referred to as a retardation energy gain 604. For example only, the adjustment determination module 602 may determine the adjustment 458 based on a function and/or a mapping that relates the retardation energy gain 604 to the adjustment 458. The adjustment determination module 602 may decrease the adjustment 458 as the retardation energy gain 604 increases and vice versa.

A gain determination module 608 determines the retardation energy gain 604 based on an amount of torque lost due to the retardation of the spark timing 280. This amount of torque may be referred to as a retardation torque loss 612. The gain determination module 608 may determine the retardation energy gain 604 further based on the engine speed 480 and a predetermined value. The gain determination module 608 may determine the retardation energy gain 604 using one or more functions and/or mappings that relate the retardation torque loss 612, the engine speed 480, and the predetermined value to the retardation energy gain 604. For example only, the gain determination module 608 may set the retardation energy gain 604 equal to the product of the retardation torque loss 612, the engine speed 480, and the predetermined value.

A torque loss determination module 616 determines the retardation torque loss 612 based on the unmanaged indicated torque 284 and the managed indicated torque 286. For example only, the torque loss determination module 616 may set the retardation torque loss 612 equal to the unmanaged indicated torque 284 minus the managed indicated torque 286.

Figure 6:
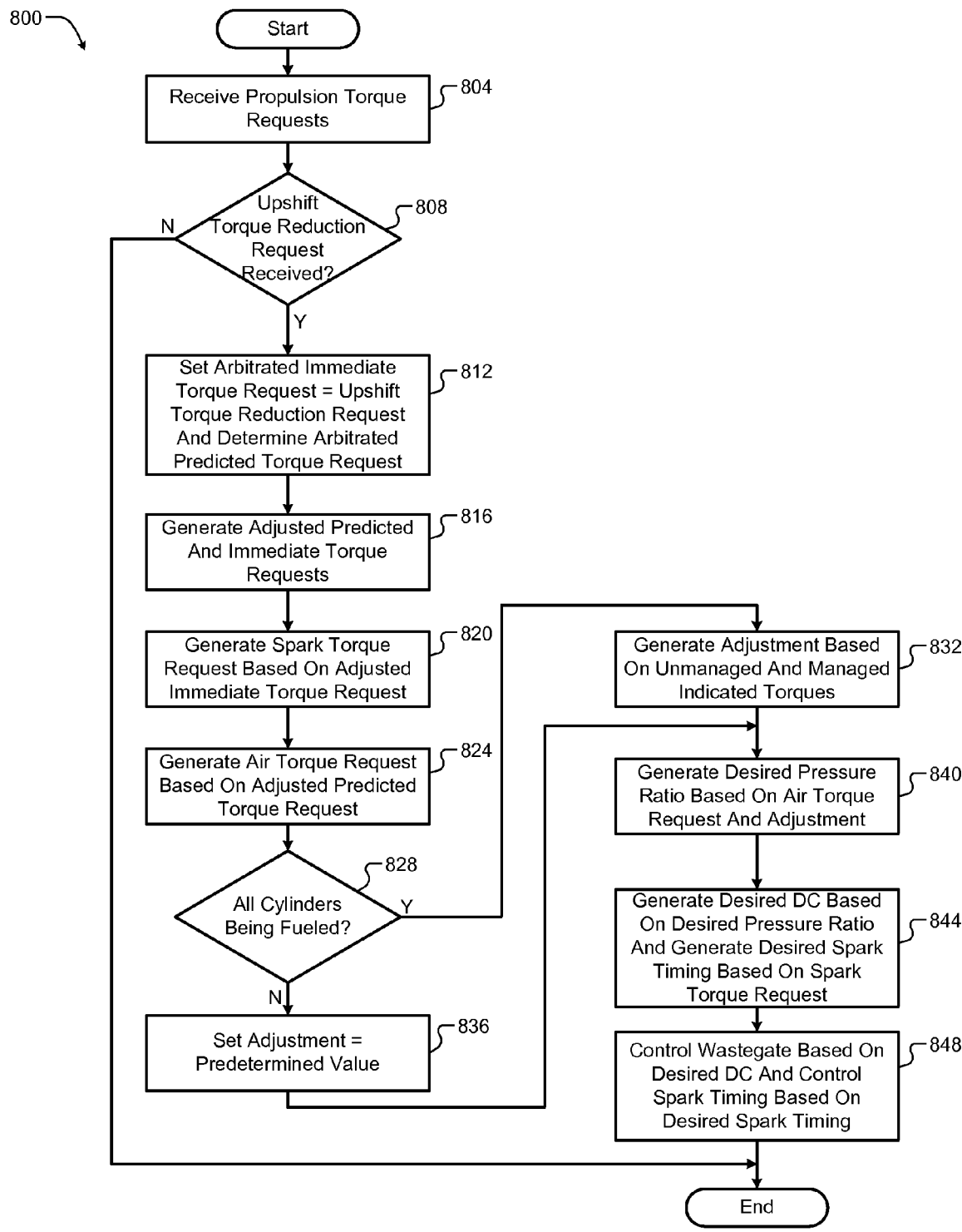
FIG. 6 is a flowchart depicting an example method of controlling a wastegate based on spark timing retard during a gear shift according to the present disclosure.

Referring now to FIG. 6, a flowchart depicting an example method 800 of controlling the wastegate 162 is presented. Control may begin with 804 where control receives the propulsion torque requests including the converted immediate and predicted torque requests. Control determines whether the upshift torque reduction request 290 has been received from or generated by the transmission control module 194 for an upshift at 808. If true, control may continue with 812; if false, control may end.

At 812, control sets the arbitrated immediate torque request 262 equal to the upshift torque reduction request 290, and control determines the arbitrated predicted torque request 261. At 816, control determines the adjusted predicted and immediate torque requests 263 and 264. Control may generate the spark torque request 269 based on the adjusted immediate torque request 264 at 820. For example only, control may set the spark torque request 269 equal to the adjusted immediate torque request 264.

Control generates the air torque request 265 based on the adjusted predicted torque request 263 at 824. For example only, control may set the air torque request 265 equal to the adjusted predicted torque request 263. At 828, control determines whether all of the cylinders of the engine 102 are being fueled. If true, control continues with 832; if false, control continues with 836.

Control generates the adjustment 458 based on the unmanaged and managed torques 284 and 286 at 832, and control continues with 840, which is discussed further below. For example only, control may generate the adjustment 458 based on the torque ratio 478 or based on the retardation energy gain 604. At 836, control sets the adjustment 458 equal to the predetermined non-adjusting value, and control continues with 840.

At 840, control generates the desired pressure ratio 462 based on the air torque request 265 and the adjustment 458. For example only, control may generate the desired MAP 266 based on the air torque request 265, control may generate the initial pressure ratio 454 based on the desired MAP 266, and control may determine the desired pressure ratio 462 based on the desired MAP 266 and the adjustment 458. At 844, control generates the desired DC 281 based on the desired pressure ratio 462, and control generates the desired spark timing 280 based on the spark torque request 269. For example only, control may generate the base desired DC 484 based on the desired pressure ratio 462, determine the closed-loop adjustment 486 based on the initial pressure ratio 454 and the measured pressure ratio 490, and generate the desired DC 281 based on the base desired DC 484 and the closed-loop adjustment 486. Control controls the opening of the wastegate 162 based on the desired DC 281 and controls the spark timing based on the desired spark timing 280 at 848. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
   a spark control module that retards spark timing relative to a predetermined spark timing when an engine torque output reduction is requested for a gear shift;
   a torque estimation module that estimates a first torque output of an engine based on N cylinders of the engine being fueled, an engine speed, an air per cylinder (APC), and the predetermined spark timing and that estimates a second torque output of the engine based on M cylinders being fueled, the engine speed, the APC, and the spark timing, wherein N is equal to a total number of cylinders of the engine and M is one of less than and equal to N;
   an initial ratio determination module that determines an initial pressure ratio across a compressor of a turbocharger;
   an adjustment determination module that determines an adjustment based on M and the first and second torque outputs;
   a desired ratio determination module that generates a desired pressure ratio across the compressor based on the adjustment and the initial pressure ratio; and
   a boost actuator module that controls opening of a wastegate associated with the turbocharger based on the desired pressure ratio.

2. The system of claim 1 wherein the boost actuator module increases the opening of the wastegate based on the adjustment when the engine torque output reduction is requested for the gear shift.

3. The system of claim 1 wherein the adjustment determination module sets the adjustment to a predetermined value when M is less than N.

4. The system of claim 1 further comprising a torque ratio determination module that sets a torque ratio equal to the second torque output divided by the first torque output,
   wherein the adjustment determination module determines the adjustment based on the torque ratio.

5. The system of claim 4 wherein the adjustment determination module selectively decreases the adjustment as the torque ratio decreases.

6. The system of claim 1 further comprising:
   an actuation module that selectively increases an air torque request for the gear shift, wherein the initial ratio determination module determines the initial pressure ratio based on the air torque request;
   a closed-loop adjustment module that generates a closed-loop adjustment based on the initial pressure ratio and a measured pressure ratio across the compressor;
   a base duty cycle (DC) determination module that determines a first desired DC based on the desired pressure ratio; and
   a desired DC determination module that determines a second desired DC based on the first desired DC and the closed-loop adjustment,
   wherein the boost actuator module controls the opening of the wastegate based on the second desired DC.

7. The system of claim 1 wherein the desired ratio determination module sets the desired pressure ratio equal to one of a product of and a sum of the adjustment and the initial pressure ratio.

8. The system of claim 1 further comprising:
   a torque loss determination module that sets a torque output loss of the engine associated with the retard of the spark timing based on a difference between the first and second torque outputs; and a gain determination module that determines an energy gain of an exhaust system associated with the engine based on the torque output loss, wherein the adjustment determination module determines the adjustment based on the energy gain.

9. The system of claim 8 wherein the adjustment determination module selectively decreases the adjustment as the energy gain increases.

10. The system of claim 8 wherein the gain determination module determines the energy gain further based on the engine speed.

11. A method comprising:
retarding spark timing relative to a predetermined spark timing when an engine torque output reduction is requested for a gear shift;
estimating a first torque output of an engine based on N cylinders of the engine being fueled, an engine speed, an air per cylinder (APC), and the predetermined spark timing;
estimating a second torque output of the engine based on M cylinders being fueled, the engine speed, the APC, and the spark timing, wherein N is equal to a total number of cylinders of the engine and M is one of less than and equal to N;
determining an initial pressure ratio across a compressor of a turbocharger;
determining an adjustment based on M and the first and second torque outputs;
generating a desired pressure ratio across the compressor based on the adjustment and the initial pressure ratio; and
controlling opening of a wastegate associated with the turbocharger based on the desired pressure ratio.

12. The method of claim 11 further comprising increasing the opening of the wastegate based on the adjustment when the engine torque output reduction is requested for the gear shift.

13. The method of claim 11 further comprising setting the adjustment to a predetermined value when M is less than N.

14. The method of claim 11 further comprising:
setting a torque ratio equal to the second torque output divided by the first torque output; and
determining the adjustment based on the torque ratio.

15. The method of claim 14 further comprising selectively decreasing the adjustment as the torque ratio decreases.

16. The method of claim 11 further comprising:
selectively increasing an air torque request for the gear shift;
determining the initial pressure ratio based on the air torque request;
generating a closed-loop adjustment based on the initial pressure ratio and a measured pressure ratio across the compressor;
determining a first desired duty cycle (DC) based on the desired pressure ratio;
determining a second desired DC based on the first desired DC and the closed-loop adjustment; and
controlling the opening of the wastegate based on the second desired DC.

17. The method of claim 11 further comprising setting the desired pressure ratio equal to one of a product of and a sum of the adjustment and the initial pressure ratio.

18. The method of claim 11 further comprising:
setting a torque output loss of the engine associated with the retard of the spark timing based on a difference between the first and second torque outputs;
determining an energy gain of an exhaust system associated with the engine based on the torque output loss; and
determining the adjustment based on the energy gain.

19. The method of claim 18 further comprising selectively decreasing the adjustment as the energy gain increases.

20. The method of claim 18 further comprising determining the energy gain further based on the engine speed.

* * * * *